United States Patent
Ishizaki et al.

(10) Patent No.: US 9,991,756 B2
(45) Date of Patent: Jun. 5, 2018

(54) STATOR, MOTOR AND COMPRESSOR

(71) Applicant: DAIKIN INDUSTRIES, LTD., Osaka-shi, Osaka (JP)

(72) Inventors: Akinobu Ishizaki, Kusatsu (JP); Hidemi Tanji, Kusatsu (JP); Keiji Aota, Kusatsu (JP); Akio Mutou, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days. days.

(21) Appl. No.: 15/534,445

(22) PCT Filed: Nov. 24, 2015

(86) PCT No.: PCT/JP2015/082842
§ 371 (c)(1),
(2) Date: Jun. 8, 2017

(87) PCT Pub. No.: WO2016/093047
PCT Pub. Date: Jun. 16, 2016

(65) Prior Publication Data
US 2017/0353075 A1    Dec. 7, 2017

(30) Foreign Application Priority Data

Dec. 10, 2014  (JP) ................................ 2014-249830
Jul. 6, 2015   (JP) ................................ 2015-135449
Oct. 28, 2015  (JP) ................................ 2015-211932

(51) Int. Cl.
H02K 3/34         (2006.01)
(52) U.S. Cl.
CPC .................... *H02K 3/345* (2013.01)
(58) Field of Classification Search
CPC .. H02K 3/18; H02K 3/30; H02K 3/34; H02K 3/32; H02K 3/325; H02K 3/38;
(Continued)

(56) References Cited

U.S. PATENT DOCUMENTS 6,225,723 B1 * 5/2001 Cooper .................... H02K 1/24
                                                 310/214
6,414,413 B1 * 7/2002 Arai ....................... H02K 1/146
                                                  29/596
(Continued)

FOREIGN PATENT DOCUMENTS

DE   10 2012 214 567 A1   2/2014
JP        10-126997 A     5/1998
(Continued)

OTHER PUBLICATIONS

International Search Report of corresponding PCT Application No. PCT/JP2015/082842 dated Feb. 16, 2016.
(Continued)

*Primary Examiner* — Tran Nguyen
(74) *Attorney, Agent, or Firm* — Global IP Counselors, LLP

(57) ABSTRACT

A stator for a motor of a compressor includes a stator core, insulator, coil, slot insulator, and inter-coil insulator. The stator core has a plurality of tooth portions arrayed circumferentially. The insulator is fitted to axial end faces of the stator core. The coil is wound on the tooth portions. The slot insulator is placed within slot portions that are spaces between circumferentially neighboring ones of the tooth portions, and which are interposed between the stator core and the coil. The inter-coil insulator is placed between circumferentially mutually neighboring windings of the coil. The inter-coil insulator is sheet shaped and folded over a width equal to double a sheet thickness at a folding-bottom portion extending along an axial direction. The folding-bottom portion is positioned on a distal end side of the tooth portions. Movement of the folding-bottom portion in a radial direction toward the rotor is restricted.

15 Claims, 13 Drawing Sheets

(58) Field of Classification Search
CPC ............ H02K 3/50; H02K 3/52; H02K 3/522;
H02K 15/00; H02K 15/02; H02K 15/09;
H02K 15/10; H02K 15/12
See application file for complete search history.

(56) References Cited

U.S. PATENT DOCUMENTS

| | | | | |
|---|---|---|---|---|
| 9,601,961 | B2* | 3/2017 | Lee | H02K 3/345 |
| 2003/0184180 | A1* | 10/2003 | Doherty | H02K 3/527 |
| | | | | 310/214 |
| 2003/0193256 | A1* | 10/2003 | Liebermann | H02K 3/24 |
| | | | | 310/194 |
| 2009/0146513 | A1* | 6/2009 | Bremner | H02K 3/325 |
| | | | | 310/64 |
| 2012/0080976 | A1* | 4/2012 | Oka | H02K 3/325 |
| | | | | 310/215 |
| 2013/0106232 | A1* | 5/2013 | Kobayashi | H02K 15/095 |
| | | | | 310/208 |

FOREIGN PATENT DOCUMENTS

| | | | | |
|---|---|---|---|---|
| JP | 2003339130 | A | * 11/2003 | ............... H02K 3/34 |
| JP | 2004-72857 | A | 3/2004 | |
| JP | 2004-312916 | A | 11/2004 | |
| JP | 2006-320136 | A | 11/2006 | |
| JP | 4470168 | B2 | 3/2010 | |
| JP | 2011-188675 | A | 9/2011 | |
| JP | 2012-130198 | A | 7/2012 | |
| JP | 2013-118717 | A | 6/2013 | |

OTHER PUBLICATIONS

International Preliminary Report of corresponding PCT Application No. PCT/JP2015/082842 dated Jun. 22, 2017.
European Search Report of corresponding EP Application No. 15 86 7771.6 dated Jan. 8, 2018.

* cited by examiner

STATOR, MOTOR AND COMPRESSOR

CROSS-REFERENCE TO RELATED APPLICATIONS

This U.S. National stage application claims priority under 35 U.S.C. § 119(a) to Japanese Patent Application Nos. 2014-249830, filed in Japan on Dec. 10, 2014, 2015-135449, filed in Japan on Jul. 6, 2015 and 2015-211932, filed in Japan on Oct. 28, 2015, the entire contents of which are hereby incorporated herein by reference.

TECHNICAL FIELD

The present invention relates to a stator, a motor, and a compressor.

BACKGROUND ART

As a conventional stator, there has been provided a stator in which an interphase insulating paper for fulfilling insulation between windings of the concentrated-winding coil is folded back in a V-like shape by a folding line that is a straight line extending along the axial direction, the insulating paper then being inserted between the windings of the coil so that the folding line is positioned radially inside of the stator see, e.g., JP 2013-118717 A).

SUMMARY

Technical Problem

With the above-described stator, unfortunately, there is a problem that the interphase insulating paper, on which a force may act to undo the folding by its elastic deformation, may be shifted radially inward of the stator so as to come out radially inward from between the coil windings.

An object of the present invention is, therefore, to provide a stator capable of securely preventing radial coming-out of the inter-coil insulator.

Another object of the invention is to provide a motor including the above-described stator.

Still further object of the invention is to provide a compressor including the above-described motor.

Solution to Problem

In order to achieve the above object, the present invention provides a stator comprising:

a stator core having a plurality of tooth portions arrayed circumferentially with intervals therebetween;

an insulator fitted to axial both end faces of the stator core;

a coil wound on the tooth portions of the stator core via the insulator;

a slot insulator which is placed within slot portions that are spaces between circumferentially neighboring ones of the tooth portions, and which are interposed between the stator core and the coil; and an inter-coil insulator placed between circumferentially mutually neighboring windings of the coil, wherein the inter-coil insulator is folded at a folding-bottom portion extending along an axial direction, the folding-bottom portion is positioned on a distal end side of the tooth portions; and movement of the folding-bottom portion in a radial direction toward the rotor is restricted by extending portions of the stator core extending on a distal end side of the tooth portions or extending portions of the slot insulator extending on the distal end side of the tooth portions.

According to the stator of this constitution, movement of the folding-bottom portion in a radial direction toward the rotor is restricted by the extending portions of the stator core extending on the distal end side of the tooth portions or the extending portions of the slot insulator extending on the distal end side of the tooth portions. Therefore, even when the inter-coil insulator has undergone an opening force acting to undo the folding by its elastic deformation, causing the inter-coil insulator to be moved toward the rotor in the radial direction, the inter-coil insulator can be prevented from moving further toward the rotor side. Thus, radial coming-out of the inter-coil insulator can be prevented securely.

In the stator of one aspect, a circumferential width of the folding-bottom portion is larger than a circumferential width of the slot opening.

Herein, the term 'slot opening' refers to a space that is smaller in circumferential width out of a space between distal ends of circumferentially neighboring tooth portions and another space between a first protrusion and a second protrusion of the slot insulator. In this case, the first protrusion of the slot insulator extends along a circumferential end portion of the distal end of one tooth portion, out of circumferentially neighboring tooth portions, toward the other tooth portion. Also, the second protrusion of the slot insulator extends along the circumferential end portion of the distal end of the other tooth portion out of circumferentially-neighboring tooth portions, toward the one tooth portion.

According to this aspect, the circumferential width of the folding-bottom portion of the inter-coil insulator is larger than the circumferential width of the slot opening. Therefore, even when the inter-coil insulator has undergone an opening force acting to undo the folding by its elastic deformation, causing the inter-coil insulator to be moved toward the rotor in the radial direction, the folding-bottom portion of the inter-coil insulator is put into contact with peripheral edge of the slot opening so that the inter-coil insulator can be prevented from moving further toward the rotor side. Thus, radial coming-out of the inter-coil insulator can be prevented securely.

In the stator of one aspect, gaps between the distal ends of neighboring ones of the tooth portions are closed by the extending portions of the slot insulator extending on the distal end side of the tooth portions.

According to this aspect, gaps between the distal ends of neighboring ones of the tooth portions are closed by the extending portions of the slot insulator extending on the distal end side of the tooth portions. Thus, radial coining-out of the inter-coil insulator can be prevented securely, In the stator of one aspect, the inter-coil insulator has, at at least one of axial both end portions of the inter-coil insulator, an engaging portion provided protruded radially on one side opposite to the rotor side so as to be engaged with the insulator.

According to this aspect, the engaging portion of the inter-coil insulator is protruded, at at least one of axial both end portions of the inter-coil insulator, radially on one side opposite to the rotor side so as to be engaged with the insulator. Thus, the possibility that the inter-coil insulator may be shifted axially so as to come out axially from between the coil windings can be prevented securely.

in the stator of one aspect,
the engaging portion of the inter-coil insulator is provided at one of radial both end portions of the inter-coil insulator on one side opposite to the rotor side.

According to this aspect, since the engaging portion of the inter-coil insulator is provided at one of the radial both end portions of the inter-coil insulator on one side opposite to the rotor side, machining of the inter-coil insulator can be lessened as compared with the case in which the engaging portion is provided at both end portions. Thus, manufacturing cost of the inter-coil insulator can be reduced.

In the stator of one aspect,
the insulator includes:
an engaged portion to be engaged with the engaging portion of the inter-coil insulator; and
a chamfered guide portion guiding the engaging portion to the engaged portion.

According to this aspect, the engaging portion of the inter-coil insulator can be guided to the engaged portion by the chamfered guide portion of the insulator. Thus, fitting of the inter-coil insulator to the insulator can be achieved simply and promptly.

In the stator of one aspect,
at least one of axial both ends of the inter-coil insulator is positioned radially inside of both ends of the coil.

According to this aspect, at least one of axial both ends of the inter-coil insulator is positioned radially inside of both ends of the coil, and not protruded from both ends of the coil. Therefore, the inter-coil insulator can be prevented from disturbing assembling work of the stator and the like.

Also, the invention provides a motor comprising:
a rotor:
the stator as defined in any one of the preceding aspects, the stator being placed so as to be radially opposed to the rotor.

With this constitution, radial coming-out of the inter-coil insulator of the stator can be prevented securely, so that a motor of high reliability can be implemented.

Also, the invention provides a compressor comprising:
a closed container;
a compression mechanism section placed within the closed container; and
the motor placed within the closed container to drive the compression mechanism section.

With this constitution, by virtue of driving the compression mechanism section with use of the motor, even when the inter-coil insulator of the stator has undergone a force for radial shift due to high-temperature, high-pressure refrigerant gas flowing within the closed container, the inter-coil insulator never comes out radially. Thus, a compressor of high reliability can be implemented.

Advantageous Effects of Invention

As apparent from the above description, according to the present invention, there can be implemented a stator capable of securely preventing radial coming-out of the inter-coil insulator, as well as a motor including the stator, and a compressor including the motor.

DESCRIPTION OF EMBODIMENTS

Hereinbelow, the stator of the present invention will be described in detail by embodiments thereof illustrated in the accompanying drawings.

First Embodiment

Figure 1:
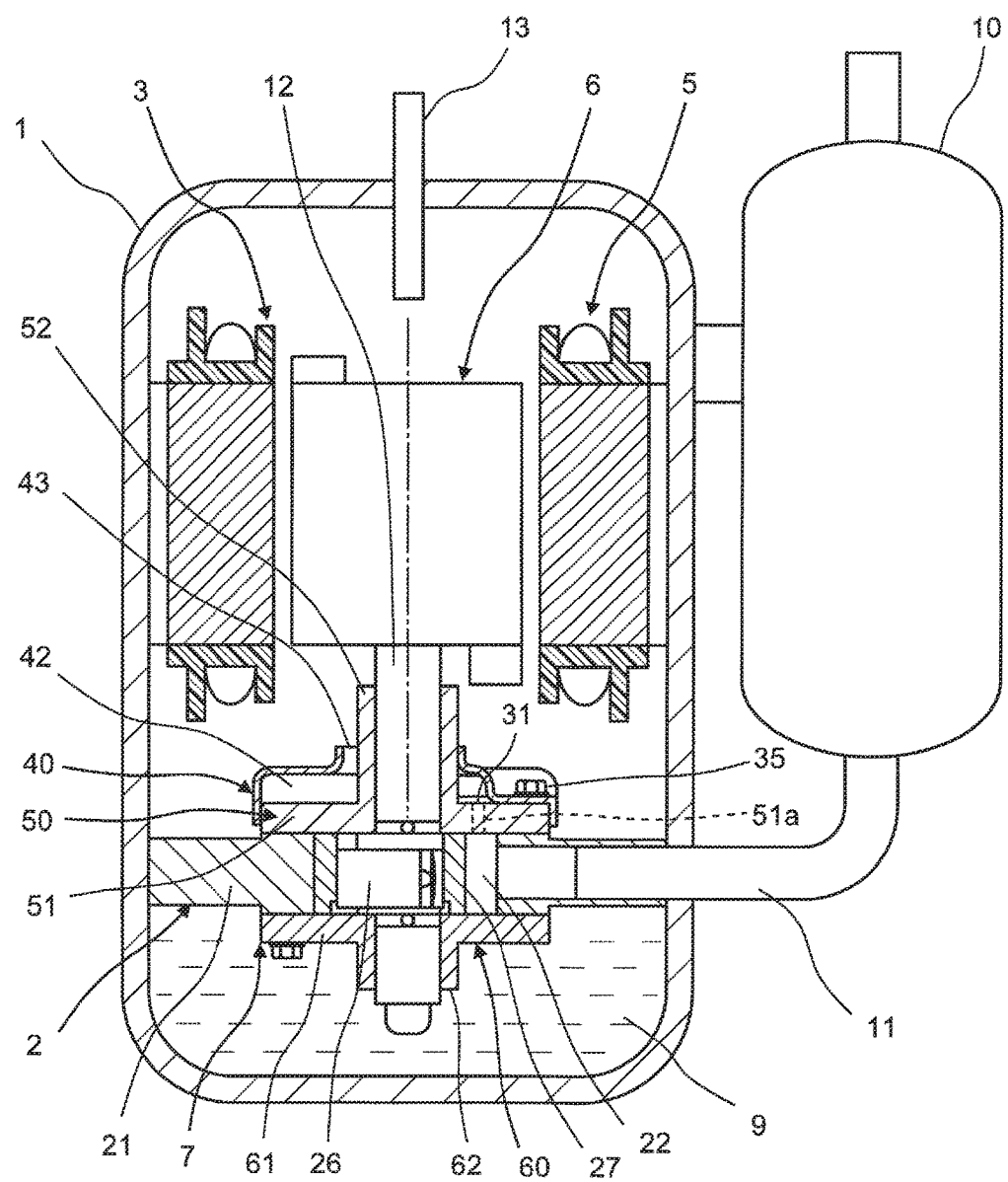
FIG. 1 is a longitudinal sectional view of a compressor according to a first embodiment of the present invention.

FIG. 1 shows a longitudinal sectional view of a compressor according to a first embodiment of the invention.

The compressor of the first embodiment, as shown in FIG. 1, includes a closed container 1, a compression mechanism section 2 placed in the closed container 1, and a motor 3 placed in the closed container 1 and serving for driving the compression mechanism section 2 via a shaft 12.

In this compressor, which is a so-called vertical-type, high-pressure dome type rotary compressor, the compression mechanism section 2 is placed below in the closed container 1 while the motor 3 is placed above the compression mechanism section 2. The compression mechanism section 2 is driven by a rotor 6 of the motor 3 via the shaft 12. The motor 3 is an inner rotor-type motor.

The compression mechanism section 2 sucks a refrigerant gas from an accumulator 10 through a suction pipe 11. The refrigerant gas is obtained by controlling a condenser, an expansion mechanism and an evaporator which are unshown and which, in combination with the compressor, constitute an air conditioner an example of a refrigeration system. The refrigerant is, for example, carbon dioxide, HFC such as R410A, or HCFC such as R22 and R32.

The compressor discharges compressed high-temperature, high-pressure refrigerant gas from the compression mechanism section 2 to fill the refrigerant gas inside the closed container 1. Furthermore, the compressor passes the refrigerant gas through a gap between the stator 5 and the rotor 6 of the motor 3 so as to cool the motor 3 and thereafter discharge the refrigerant gas outside through a discharge pipe 13 provided above the motor 3.

An oil reservoir 9 in which lubricating oil has been reserved is formed in lower portion of a high-pressure region within the closed container 1. The lubricating oil passes from the oil reservoir 9 through an oil passage (not shown) provided in the shaft 12 so as to move to bearings or other sliding-contact portions of the compression mechanism section 2 and the motor 3, thereby lubricating the sliding-contact portions. The lubricating oil is, for example, polyalkylene glycol oil (polyethylene glycol, polypropylene glycol, etc.), ether oil, ester oil, mineral oil, or the like.

The compression mechanism section 2 includes a cylinder 21 mounted on an inner surface of the closed container 1, and an upper end plate member 50 as well as a lower end plate member 60 fitted at upper-and-lower opening ends of the cylinder 21, respectively. The cylinder 21, the upper end plate member 50, and the lower end plate member 60 form a cylinder chamber 22.

The upper end plate member 50 includes a disc-shaped body portion 51, and a boss portion 52 upwardly provided at a center of the body portion 51. The shaft 12 is inserted through the body portion 51 and the boss portion 52.

The body portion 51 is provided with a discharge hole 51a communicating with the cylinder chamber 22. A discharge valve 31 is fitted to the body portion 51 so as to be positioned on one side of the body portion 51 opposite to the side on which the cylinder 21 is provided. The discharge valve 31 is, for example, a reed valve for opening and closing the discharge hole 51a.

A cup-shaped muffler cover 40 is fitted to the body portion 51 on the side opposite to the cylinder 21 side so as to cover the discharge valve 31. The muffler cover 40 is fixed to the body portion 51 by a bolt 35 or the like. The boss portion 52 is inserted through the muffler cover 40.

The muffler cover 40 and the upper end plate member 50 define a muffler chamber 42. The muffler chamber 42 and the cylinder chamber 22 are communicated with each other via the discharge hole 51a.

The muffler cover 40 has a hole portion 43 by which the muffler chamber 42 and outside of the muffler cover 40 are communicated with each other.

The lower end plate member 60 includes a disc-shaped body portion 61, and a boss portion 62 downwardly presided at a center of the body portion 61. The shaft 12 is inserted through the body portion 61 and the boss portion 62.

As described above, one end portion of the shaft 12 is supported by the upper end plate member 50 and the lower end plate member 60. That is, the shaft 12 cantilevers. One end portion (support end side) of the shaft 12 extends into inside of the cylinder chamber 22.

On the support end side of the shaft 12, an eccentric pin 26 is provided so as to be positioned within the cylinder chamber 22 on the compression mechanism section 2 side. The eccentric pin 26 is fitted into a roller 27. The roller 27 is revolvably placed in the cylinder chamber 22 so that the revolving motion of the roller 27 fulfills compression action.

In other words, one end portion of the shaft 12 is supported at both sides of the eccentric pin 26 by a housing 7 of the compression mechanism section 2. The housing 7 includes the upper end plate member 50 and the lower end plate member 60.

Figure 2:
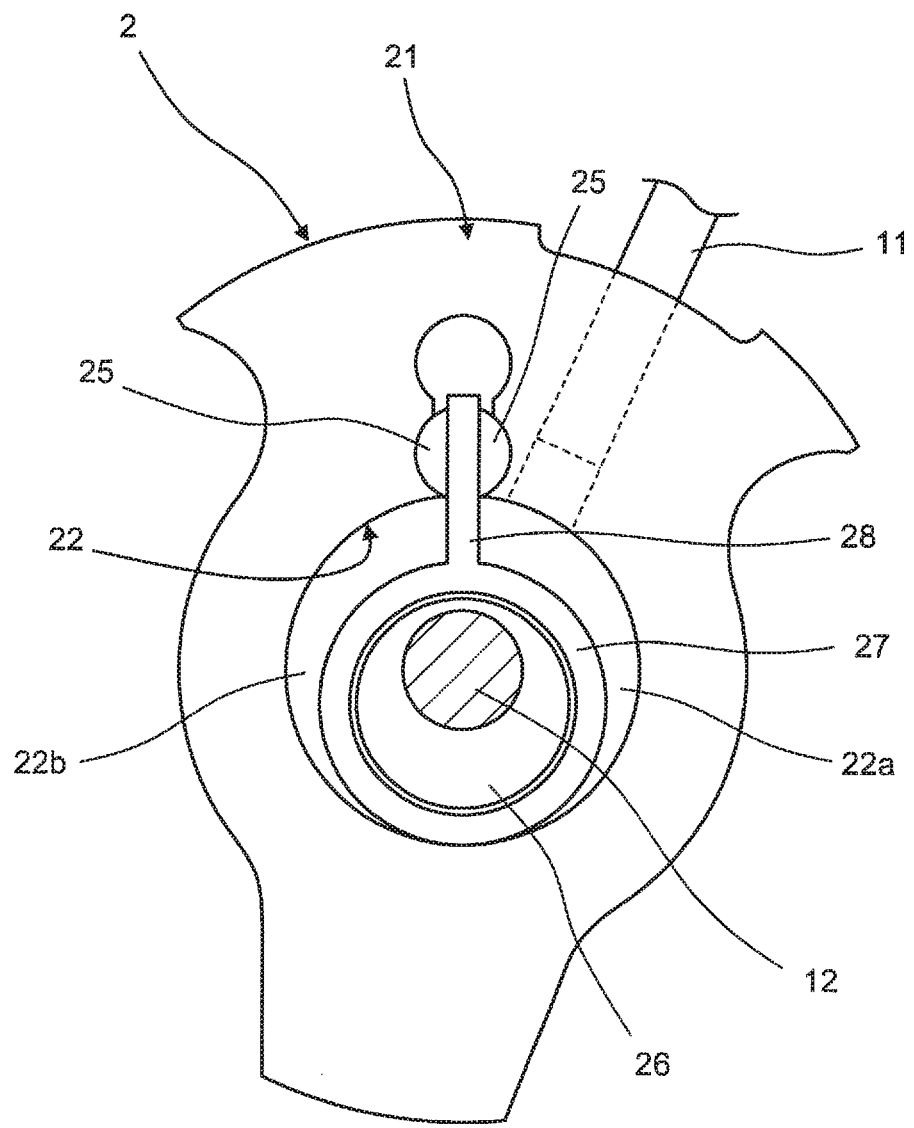
FIG. 2 is a plan view of main part of the compressor.

Next, the compression action of the cylinder 21 of the compression mechanism section 2 will be described with reference to FIG. 2. FIG. 2 shows a plan view of main part of the compressor.

As shown in FIG. 2, the cylinder chamber 22 is partitioned by a blade 28 integrally provided with the roller 27. That is, in a chamber on the right side of the blade 28, the suction pipe 11 is opened in an inner surface of the cylinder chamber 22 to form a suction chamber (low-pressure chamber) 22a. On the other hand, in a chamber on the left side of the blade 28, the discharge hole 51a (shown in FIG. 1) is opened in the inner surface of the cylinder chamber 22 to form a discharge chamber (high-pressure chamber) 22b.

Semicolumnar-shaped bushings 25, 25 are provided in close contact with both sides of the blade 28, respectively, to serve for sealing. Clearances between the blade 28 and the bushings 25, 25 are lubricated by lubricating oil.

Then, the eccentric pin 26 is eccentrically rotated along with the shaft 12, by which the roller 27 fitted to the eccentric pin 26 is revolved while keeping the outer circumferential surface of the roller 27 in contact with the inner circumferential surface of the cylinder chamber 22.

As the roller 27 is revolved in the cylinder chamber 22, the blade 28 is advanced and retreated while both-side surfaces of the blade 26 are held by the bushings 25, 25. As a result, low-pressure refrigerant gas is sucked through the suction pipe 11 into the suction chamber 22a and compressed to high pressure in the discharge chamber 22b. Thereafter, high-pressure refrigerant gas is discharged through the discharge hole 51a (shown in FIG. 1).

Afterwards, as shown in FIG. 1, the refrigerant gas discharged from the discharge hole 51a is exhausted via the muffler chamber 42 to outside of the muffler cover 40.

Figure 3:
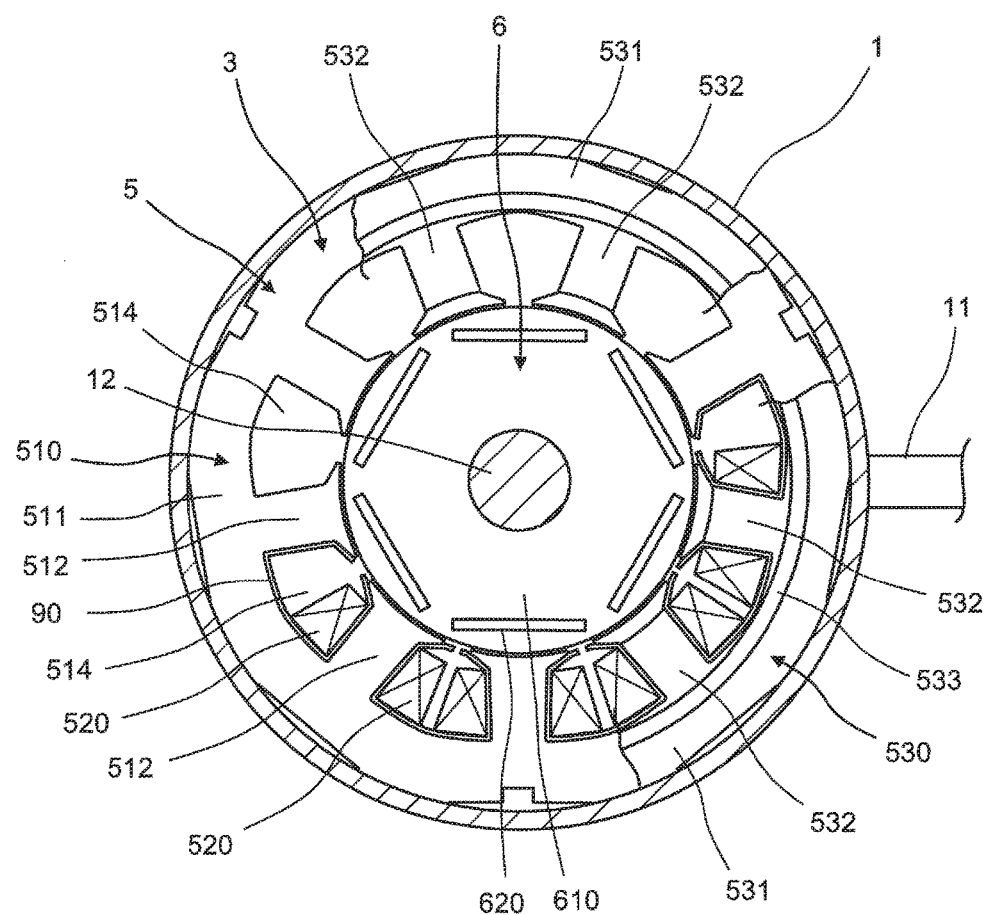
FIG. 3 is a transverse sectional view of a motor-containing main part of the compressor.

FIG. 3 shows a transverse sectional view of a motor 3—containing main part of the compressor. In FIG. 3, the same constituent members as in FIG. 1 are designated by the same reference signs.

As shown in FIG. 3, the motor 3 mounted on the closed container 1 includes the rotor 6, and the stator 5 placed radially outside the rotor 6 with an air gap interposed therebetween.

The rotor 6 includes a columnar-shaped rotor core 610, and six magnets 620 buried in the rotor core 610 with circumferential intervals. The rotor core 610 is formed of, for example, stacked electromagnetic steel plates. The shaft 12 is mounted at a central hole portion of the rotor core 610. The magnets 620 are flat-shaped permanent magnets.

The stator 5 is placed so as to be radially opposed to the rotor 6. The stator 5 includes a stator core 510, insulators 530 fitted to axial both end faces of the stator core 510, and a coil 520 wound around both the stator core 510 and the insulator 530. In FIG. 3, the coil 520 and the insulator 530 are partly omitted.

The stator core 510, which is formed of, for example, stacked plural steel plates, is fitted into the closed container 1 by shrinkage fit or the like. The stator core 510 includes a cylindrical-shaped back yoke portion 511, and nine tooth portions 512 which are protruded radially inward from an inner circumferential surface of the back yoke portion 511 and which are arrayed circumferentially at generally equal intervals.

The coil 520 is wound around the tooth portions 512, respectively, and not wound over a plurality of tooth portions 512, hence a so-called concentrated winding. The motor 3 is the so-called 6-pole 9-slot type. With an electromagnetic force generated in the stator 5 by passing an electric current through the coil 520, the rotor 6 along with the shaft 12 is rotated.

The insulator 530 is interposed between the stator core 510 and the coil 520 to insulate the stator core 510 and the coil 520 from each other. The insulator 520 is molded with resin as an example. The insulator 530 includes an annular portion 531, nine dent portions 532 protruded radially inward from an inner circumferential surface of the annular portion 531 and arrayed circumferentially at generally equal intervals, and a cylindrical-shaped outer wall portion 533 erected on an axial end face of the annular portion 531. The dent portions 532 are positioned opposed to axial both end faces, respectively, of the tooth portions 512 of the stator core 510.

In slot portions 514, which are spaces between neighboring tooth portions 512 in the circumferential direction of the stator core 510, a slot insulator 90 is provided along inner circumferential surfaces of the tooth portions 512 and the back yoke portion 511.

Figure 4:
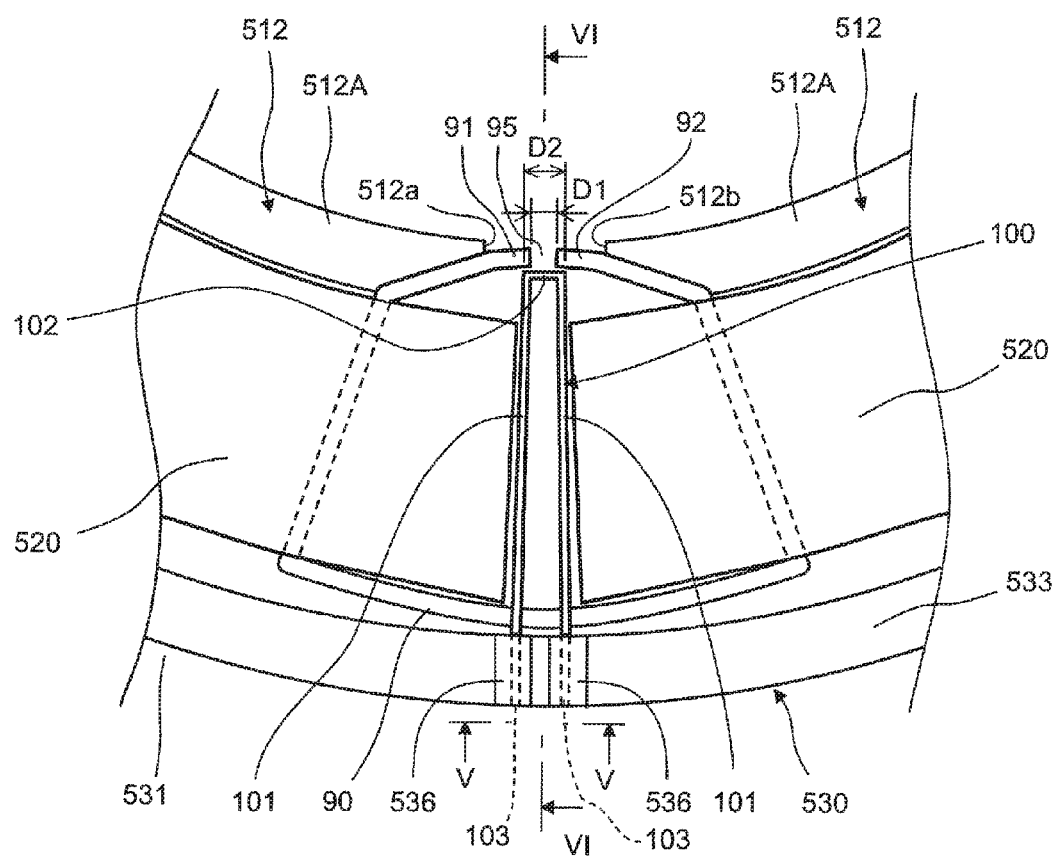
FIG. 4 is a main-part enlarged view of the stator of the motor.

FIG. 4 shows a main-part enlarged view of the motor 3, where the same constituent members as in FIG. 3 are designated by the same reference signs.

As shown in FIG. 4, an inter-coil insulator 100 is inserted between circumferentially-neighboring coil windings 520. The inter-coil insulator 100 and the slot insulator 90 are formed from a sheet-like resin material such as resin-made insulating films and resin-molded products, for which polyethylene terephthalate (PET) as an example is used.

The slot insulator 90 is interlaid between the tooth portions 512 and the coil 520. The slot insulator 90 has a first protrusion 91 and a second protrusion 92. The first protrusion 91 is protruded circumferentially toward the slot portion 514 more than an end portion 512a of a distal end portion 512A of one of neighboring tooth portions 512. The second protrusion 92 is protruded circumferentially toward the slot portion 514 more than an end portion 512b of a distal end portion 512A of the other one of the neighboring tooth portions 512. A distal end of the first protrusion 91 and a distal end of the second protrusion 92 are circumferentially opposed to each other and slightly separated from each other. A space between the distal end of the first protrusion 91 and the distal end of the second protrusion 92 is a slot opening 95.

Under the condition that the end portion 512a of the tooth portion 512 is protruded circumferentially toward the slot portion 514 more than a circumferential end portion of the slot insulator 90 and moreover the end portion 512b of the tooth portion 512 is protruded circumferentially toward the slot portion 514 more than the circumferential end portion of the slot insulator 90, a space between the end portion 512a and the end portion 512b of the tooth portion 512 becomes a slot opening. Thus, the term, slot opening, refers to the space smaller in circumferential width out of a space between distal ends of circumferentially neighboring tooth portions and another space between the first protrusion and the second protrusion of the slot insulator.

The inter-coil insulator 100 is folded by folding lines that are given by two straight lines extending along the axial direction with a spacing therebetween, so that the inter-coil insulator 100 is formed into a generally tilted U-shaped cross section as viewed in a plan view perpendicular to the axis. The inter-coil insulator 100 has inter-coil insertion portions 101, 101, a folding-bottom portion 102, and engaging portions 103, 103. The engaging portions 103, 103 are provided so as to be protruded radially outward, i.e., protruded from axial upper end portions of the inter-coil insertion portions 101, 101 toward radial one side counter to the rotor 6 (shown in FIG. 3) side.

The folding-bottom portion 102 extends along the axial direction and is positioned on one side on which the distal end portions 512A of the tooth portions 512 are provided. A circumferential width D2 of the folding-bottom portion 102 is larger than a circumferential width D1 of the slot opening 95. Accordingly, the inter-coil insulator 100, when moved radially toward the rotor 6 side, comes into contact with the first protrusion 91 and the second protrusion 92 of the slot insulator 90 so that radial movement of the folding-bottom portion 102 toward the rotor side is restricted. Thus, radial coming-out of the inter-coil insulator 100 can be prevented securely.

Figure 5:
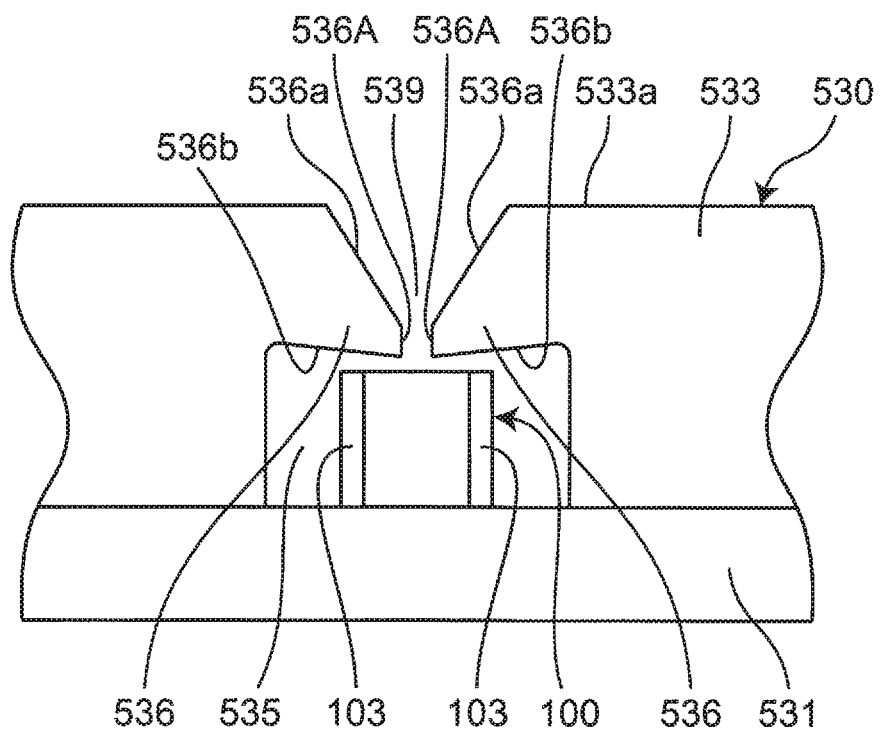
FIG. 5 is a side view taken along the line V-V of FIG. 4.

FIG. 5 shows a side view taken along the line V-V of FIG. 4, where the same constituent members as in FIG. 4 are designated by the same reference signs.

As shown in FIG. 5, the outer wall portion 533 of the insulator 530 includes an engaged portion 535 to be engaged with the engaging portions 103, 103 of the inter-coil insulator 100, and chamfered guide portions 536, 536 for guiding the engaging portions 103, 103 to the engaged portion 535.

The engaged portion 535 is positioned on one side in the axial direction closer to the stator core 510 (shown in FIG. 6) than the chamfered guide portions 536, 536, i.e., on the lower side of the chamfered guide portions 536, 536. The engaged portion 535 is a generally rectangular-shaped hole portion as viewed in a side view. The circumferential size of the engaged portion 535 is larger than the size between circumferentially-outer end faces of the engaging portions 103, 103 of the inter-coil insulator 100 in the state that the engaging portions 103, 103 are engaged with the engaged portion 535. Also, the axial size of the engaged portion 535 is larger than the axial size of the engaging portions 103, 103.

The chamfered guide portions 536, 536 are protruded so to be opposed to each other in the circumferential direction and moreover be separated from each other. The chamfered guide portions 536, 536 have circumferential distal end faces 536A, 536A, axial one-side end faces 536a, 536a, and axial other-side end faces 536b, 536b. The chamfered guide portions 536, 536 each have a generally trapezoidal shape. The axial width of the chamfered guide portions 536, 536 continuously decreases toward the distal end faces 536A, 536A.

The end faces 536a, 536a of the chamfered guide portions 536, 536 are adjacent to an end face 533a of the outer wall portion 533 of the insulator 530, and moreover extend in an oblique direction relative to the circumferential direction. The end faces 536b, 536b of the chamfered guide portions 536, 536 extend in the circumferential direction to form end faces of the engaged portion 535 on the side opposite to the stator core 510 side, i.e., on the upper side.

When the engaging portions 103, 103 of the inter-coil insulator 100 are engaged with the engaged portion 535, the engaging portions 103, 103 are guided into the engaged portion 535 by the end faces 536a, 536a of the chamfered guide portions 536, 536. In this case, the distance between the engaging portions 103, 103 is decreased gradually by the chamfered guide portions 536, 536. When the engaging portions 103, 103 pass through between the distal end faces 5360, 536A of the chamfered guide portions 536, 536, the circumferentially-inner end faces of the engaging portions 103, 103 come into contact with each other.

Figure 6:
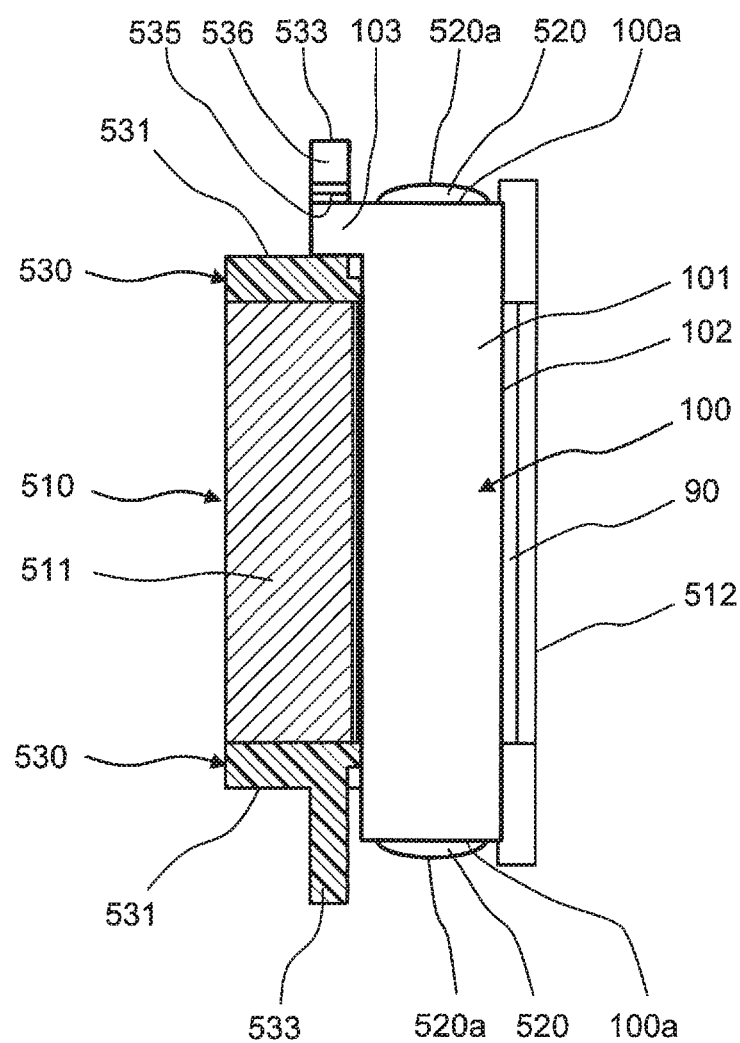
FIG. 6 is a longitudinal sectional view taken along the line VI-VI of FIG. 4.

FIG. 6 shows a longitudinal sectional view taken along the line VI-VI of FIG. 4, where the same constituent members as in FIGS. 3 to 5 are designated by the same reference signs.

As shown in FIG. 6, axial both ends 100a, 100a of the inter-coil insulator 100 are positioned axially inside of both ends 520a, 520a of the coil 520. With the inter-coil insertion portion 101 inserted between circumferentially mutually-neighboring coil windings 520, the engaging portions 103, 103 provided at axial upper end portions of the inter-coil insertion portion 101 are engaged with the engaged portion 535 of the insulator 530. As a result of this, even when a force for axial shift is applied to the inter-coil insulator 100, the axial end faces of the engaging portions 103, 103 are brought into contact with the axial end face of the engaged portion 535, so that axial coming-off of the inter-coil insulator 100 can be prevented.

Figure 7:
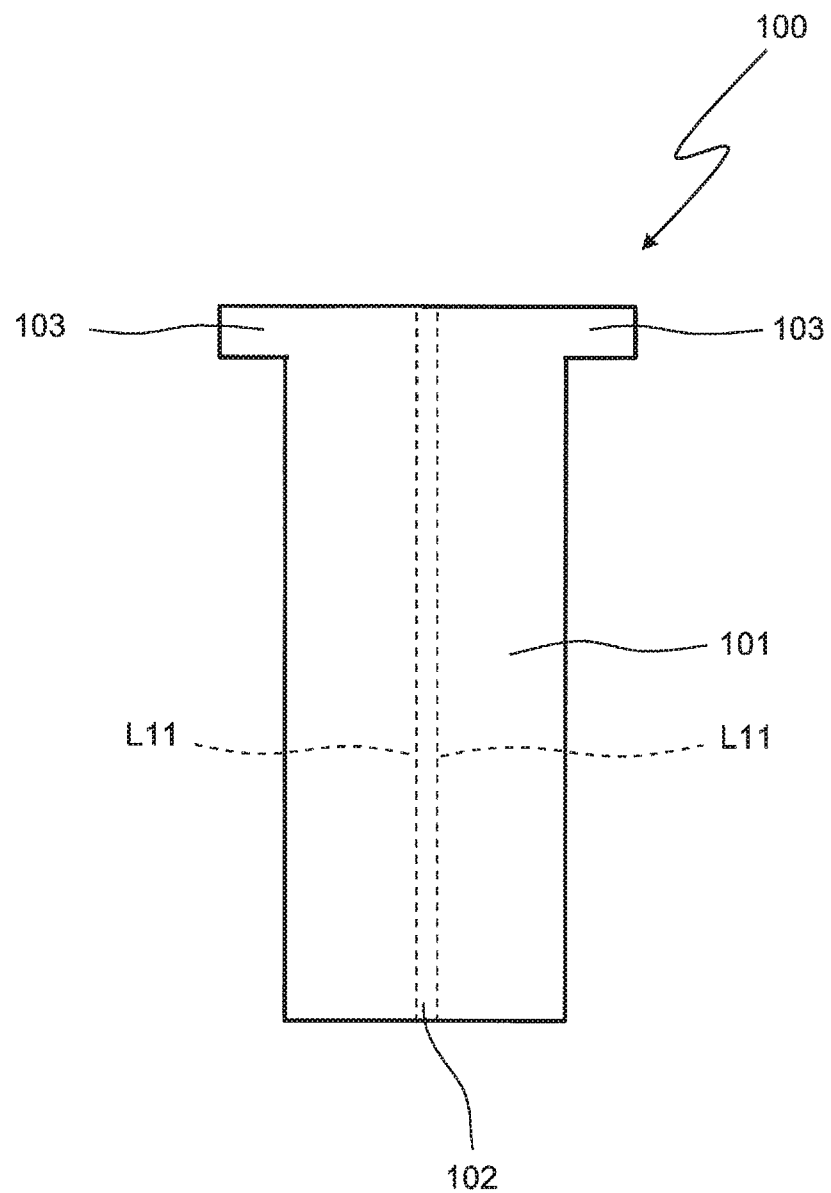
FIG. 7 is a developed view of an inter-coil insulator of the stator.

FIG. 7 shows a developed view of the inter-coil insulator 100. As shown in FIG. 7, the inter-coil insulator 100 has a generally T-like shape. The inter-coil insertion portion 101 of the inter-coil insulator 100 has a generally rectangular shape. At longitudinal one end portion of the inter-coil insertion portion 101, the engaging portions 103, 103 are provided so as to be protruded from the inter-coil insertion portion 101 in a direction perpendicular to the longitudinal direction. The engaging portions 103, 103 are provided at both end portions, respectively, of the inter-coil insertion portion 101 in a direction perpendicular to its longitudinal direction. The engaging portions 103, 103 each have a generally rectangular shape.

The inter-coil insulator 100 is to be folded back by folding lines that are given by two straight lines L11, L11. The two straight lines L11, L11 extend along the longitudinal direction of the inter-coil insulator 100 in parallel to each other and with a spacing to each other in central part of directions perpendicular to the longitudinal direction. The folding-bottom portion 102 of the inter-coil insulator 100 is a region between the two straight lines L11, L11.

In this first embodiment, the engaging portions 103, 103 each have a generally rectangular shape, but their shape is not limited to this. For example, the engaging portions may have a trapezoidal or triangular or other shape.

Figure 8:
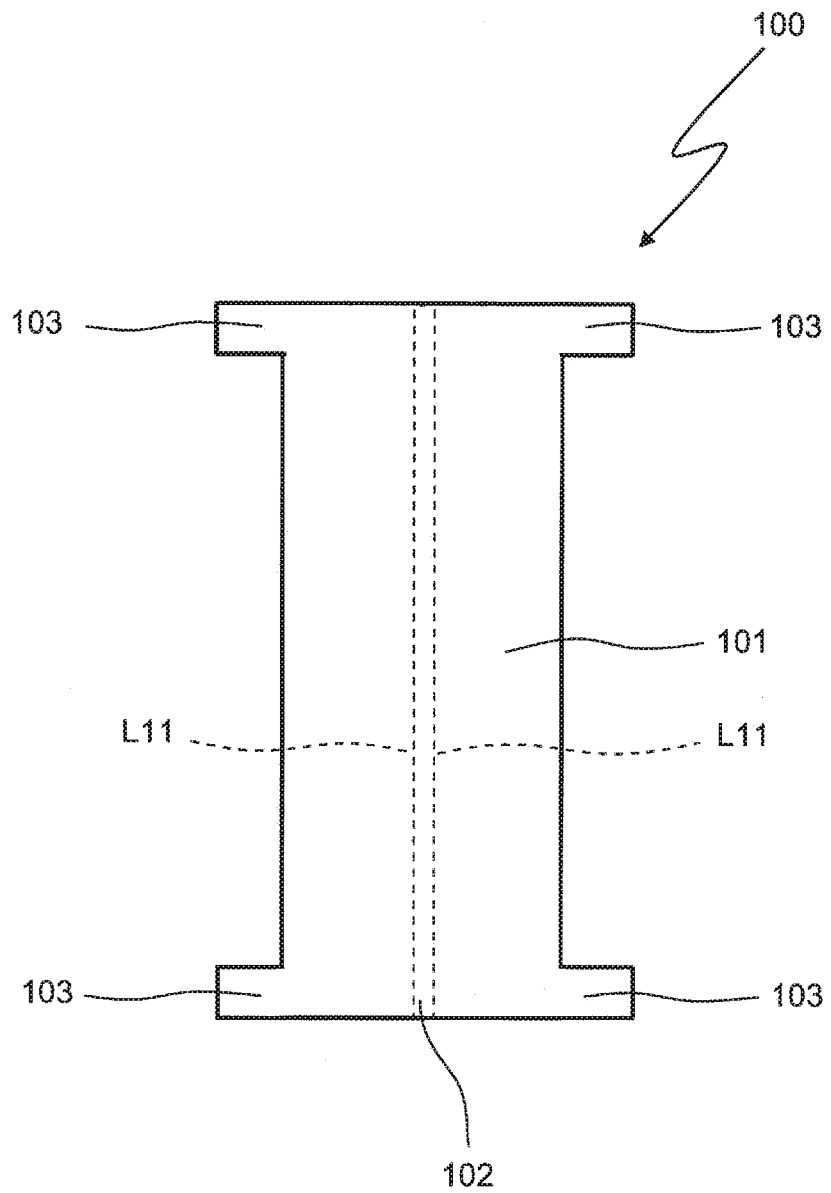
FIG. 8 is a developed view of a modification of the inter-coil insulator.

Also in the first embodiment, the engaging portions 103, 103 are provided at longitudinal one end portion of the inter-coil insertion portion 101. However, as in a modification shown in FIG. 8, the engaging portion 103 may be provided at longitudinal both end portions of the inter-coil insertion portion 101. In this case, coming-off of the inter-coil insulator 100 from between the coil windings in the longitudinal direction of the inter-coil insertion portion 101 can be prevented more securely.

Figure 9:
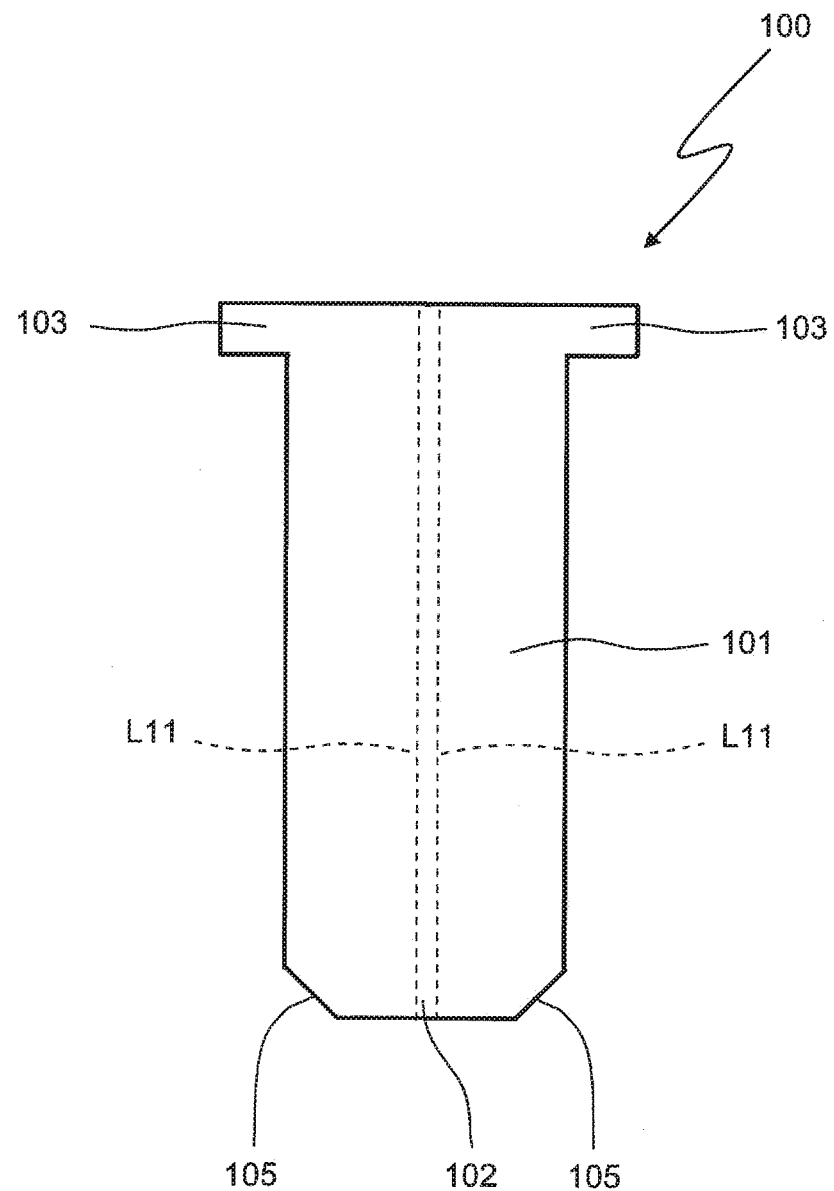
FIG. 9 is a developed view of a modification of the inter-coil insulator.

Also in the first embodiment, the engaging portions 103, 103 are provided at longitudinal one end portion of the inter-coil insertion portion 101. However, as in a modification shown in FIG. 9, a chamfered portion 105 may be provided at a longitudinal other-end corner of the inter-coil insertion portion 101. In this case, when the inter-coil insulator 100 is inserted between circumferentially neighboring coil windings 520, the chamfered portion 105 makes it possible to facilitate the insertion of the inter-coil insertion portion 101 between the coil windings 520 and moreover to suppress the possibility of damage to corners of the inter-coil insertion portion 101.

Figure 10:
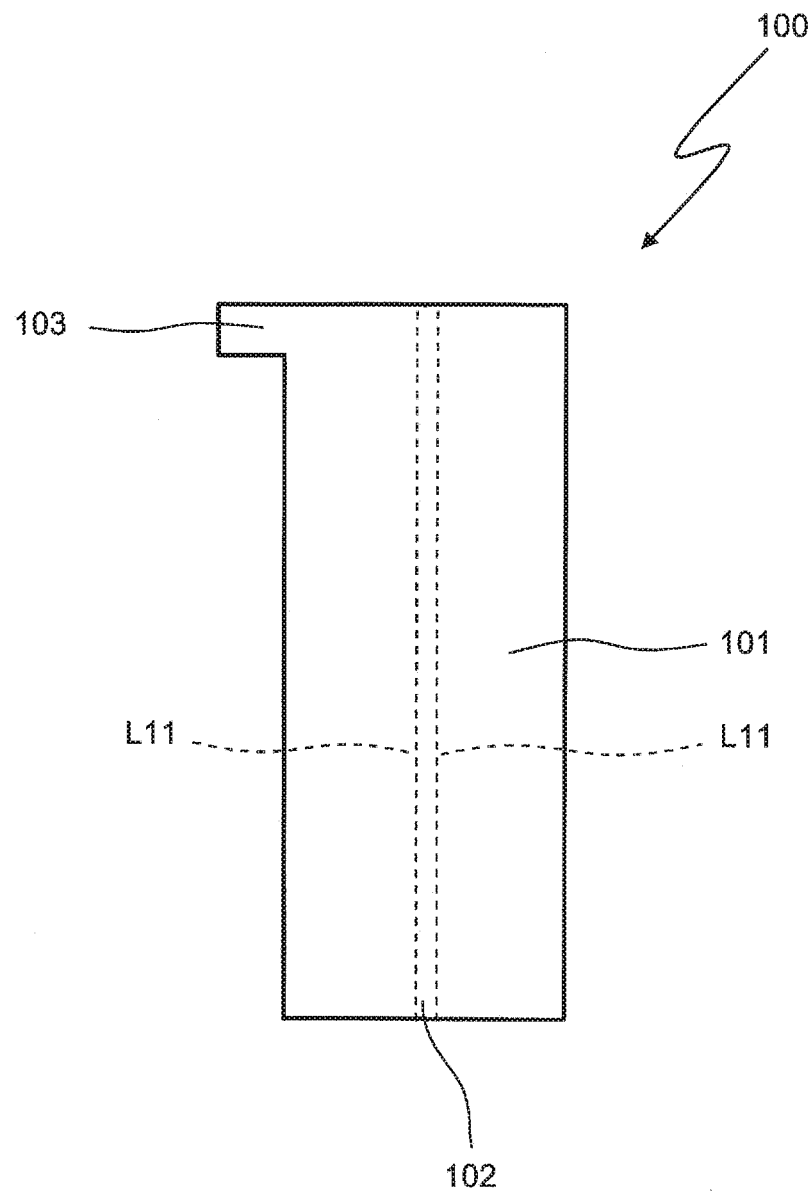
FIG. 10 is a developed view of a modification of the inter-coil insulator.

Also in the first embodiment, the engaging portions 103, 103 are provided at both end portions, respectively, of the inter-coil insertion portion 101 in a direction perpendicular to its longitudinal direction. However, as in a modification shown in FIG. 10, the engaging portion 103 may be provided only at one end of the inter-coil insertion portion 101 in a direction perpendicular to its longitudinal direction. In this case, machining of the inter-coil insulator 100 can be lessened as compared with the case in which the engaging portion 103 is provided at both end portions, so that manufacturing cost of the inter-coil insulator 100 can be reduced.

Second Embodiment

Figure 11:
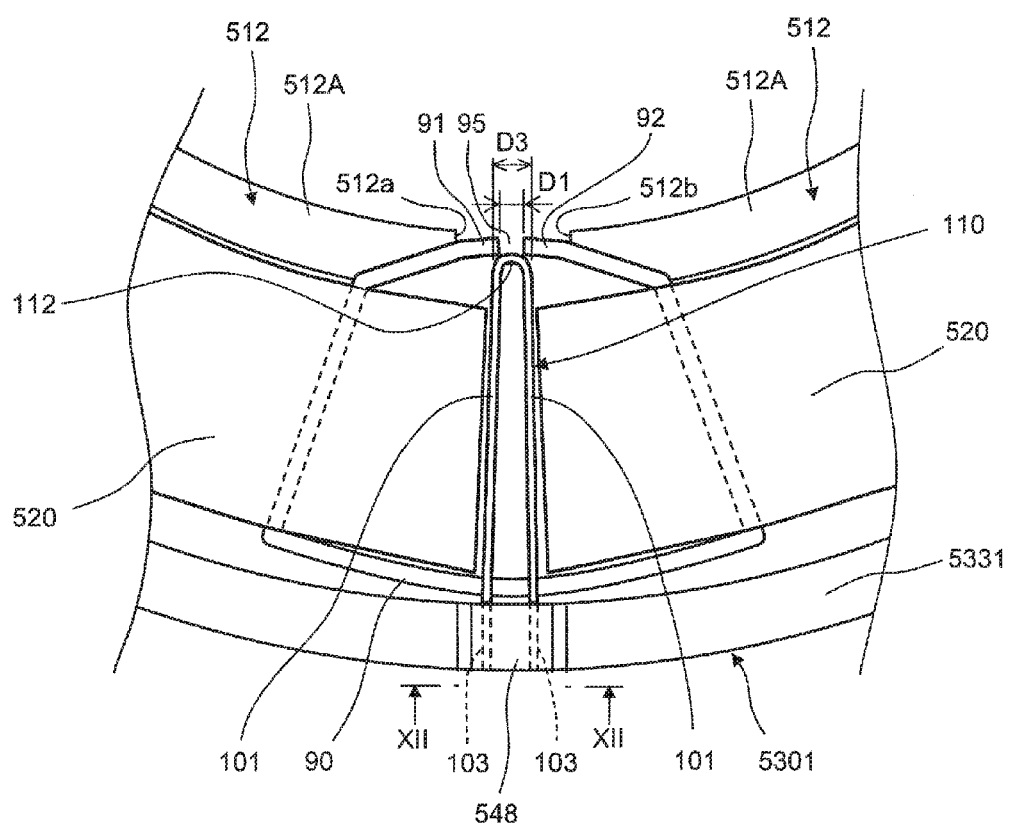
FIG. 11 is a main-part enlarged view of a motor of a compressor according to a second embodiment of the invention.

FIG. 11 is a main-part enlarged view of a motor 3 of a compressor according to a second embodiment of the invention. The compressor of this second embodiment differs from the first embodiment in the shape of an inter-coil insulator 110 as well as the shape of an engaged portion 545 of the insulator 5301. In this second embodiment, the same reference signs in the first embodiment designate the same constituent members as in the first embodiment and therefore their description is omitted.

As shown in FIG. 11, the inter-coil insulator 110 is folded along the axial direction so as to be formed into a U-like shape in cross section as viewed in a plan view perpendicular to the axis. The inter-coil insulator 110 includes inter-coil insertion portions 101, 101, a folding-bottom portion 112, and engaging portions 103, 103. The inter-coil insulator 110, like the slot insulator 90, is formed from a sheet-like resin material such as resin-made insulating films and resin-molded products, for which polyethylene terephthalate (PET) as an example is used.

The folding-bottom portion 112 extends along the axial direction and is positioned on one side on which the distal end portions 512A of the tooth portions 512 are provided. A circumferential width D3 of the folding-bottom portion 112 is larger than a circumferential width D1 of the slot opening 95.

Figure 12:
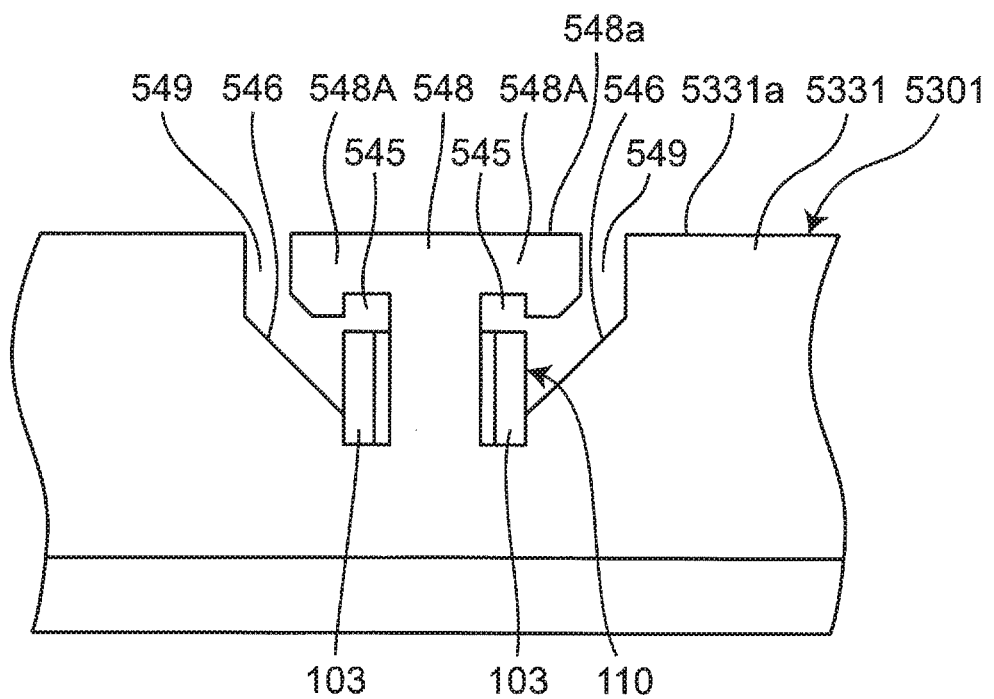
FIG. 12 is a side view taken along the line XII-XII of FIG. 11.

FIG. 12 shows a side view taken along the line XII-XII of FIG. 11, where the same constituent members as in FIG. 5 are designated by the same reference signs.

As shown in FIG. 12, an outer wall portion 5331 of the insulator 5301 includes engaged portions 545, 545 to be engaged with the engaging portions 103, 103 of the inter-coil insulator 110, chamfered guide portions 546, 546 for guiding the engaging portions 103, 103 to the engaged portions 545, 545, and a pillar portion 548 provided between the chamfered guide portions 546, 546.

The pillar portion 548 is protruded upward, i.e., toward the side opposite to the stator core 510 (shown in FIG. 6) side in the axial direction. The pillar portion 548 has a generally T-like shape as viewed in a side view. The pillar portion 548 includes an upper-side upper end face 548a, and protruded portions 548A, 548A circumferentially protruded at upper ends. The upper end face 548a extends so as to be flush with an end face 5331a of the insulator 5301.

The engaged portions 545, 545 are positioned on one side in the axial direction closer to the stator core 510 than the protruded portions 548A, 548A of the pillar portion 548, i.e., on the lower side of the protruded portions 548A, 548A. The engaged portions 545, 545 are generally rectangular-shaped hole portions as viewed in a side view. The circumferential size of the engaged portions 545, 545 is generally equal to the circumferential size of the engaging portions 103, 103 of the inter-coil insulator 110. Also, the axial size of the engaged portions 545, 545 is larger than the axial size of the engaging portions 103, 103.

The chamfered guide portions 546, 546 extend from the end face 5331a of the insulator 5301 downward along the axial direction. The chamfered guide portions 546, 546 also extend in an oblique direction relative to the axial direction below the protruded portions 548A, 548A of the pillar portion 548, i.e., in such a direction as to approach the pillar portion 548 in the circumferential direction as the chamfered guide portions 546, 546 go downward more and more.

The chamfered guide portions 546, 546 and the pillar portion 548 form communicating portions 549, 549 which are communicated with the engaged portions 545, 545, respectively. When the engaging portions 103, 103 of the inter-coil insulator 110 are engaged with the engaged portions 545, 545, the engaging portions 103, 103 are inserted into the communicating portions 549, 549 and guided into the engaged portions 545, 545 by the chamfered guide portions 546, 546, respectively.

The stator, the motor and the compressor of the second embodiment have the same effects as the stator, the motor and the compressor of the first embodiment.

The first and second embodiments have been described on a compressor including an inner rotor-type motor. However, the invention may be applied to outer rotor-type motors as well as compressors including such a motor.

In the first and second embodiments, the inter-coil insulator 100, 110 has the engaging portion 103. However, without being limited to this, the inter-coil insulator 100, 110 may have no engaging portion.

Also in the first and second embodiments, the insulator 530, 5301 has the engaged portions 535, 545 to be engaged with the engaging portion 103 of the inter-coil insulator 100, 110, and the chamfered guide portions 536, 546 for guiding the engaging portion 103 to the engaged portions 535, 545. However, the insulator may have neither the engaged portions nor the chamfered guide portions.

Also in the first and second embodiments, axial both ends 100a, 100a of the inter-coil insulator 100, 110 are positioned axially inside of both ends 520a, 520a of the coil 520. However, this is not limitative. For example, both end portions of the inter-coil insulator may be positioned axially outside of both end portions of the coil. Further, at least one of axial both ends of the inter-coil insulator may be positioned axially inside of both ends of the coil.

Although specific embodiments of the present invention have been described hereinabove, yet the invention is not limited to the above first and second embodiments and may be carried out as they are changed and modified in various ways within the scope of the invention.

Third Embodiment

Figure 13:
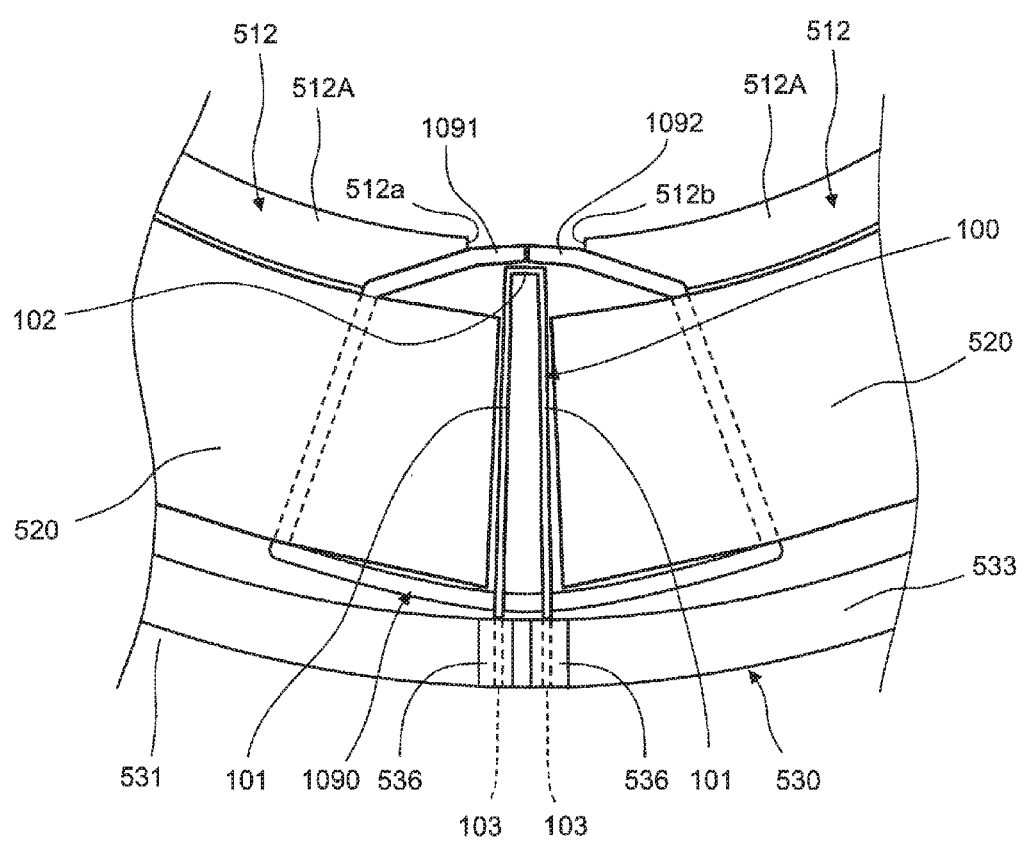
FIG. 13 is a main-part enlarged view of a stator of a motor according to a third embodiment.

FIG. 13 is a main-part enlarged view of a stator of a motor according to a third embodiment. The stator of this third embodiment differs from the stator of the first embodiment shown in FIG. 4 only in the structure of a slot insulator 1090. Accordingly, in FIG. 13, the same constituent members as in FIG. 4 are designated by the same reference signs as the constituent members of FIG. 4, with their detailed description omitted.

As shown in FIG. 13, distal ends of portions 1091, 1092 of the slot insulator 1090 extending along the distal end portions 512A, 512A of the tooth portions 512, 512 are in contact with each other. Accordingly, gaps between the end portions 512a, 512b of the distal end portions 512A, 512A of the tooth portions 512, 512 are closed by the portions 1091, 1092.

The slot insulator 1090 is formed from such material as polyethylene terephthalate (PET) or other resins as in the first embodiment.

According to the stator constituted as described above, as shown in FIG. 13, gaps between the end portions 512a, 512b of the distal end portions 512A, 512A of the tooth portions 512, 512 are closed by the portions 1091, 1092 of the slot insulator 1090. Therefore, even when the inter-coil insulator 100 goes to be shifted toward the distal ends of the tooth portions 512, 512, the folding-bottom portion 102 of the inter-coil insulator 100 comes into contact with the mutually contacting portions 1091, 1092 of the slot insulator 1090, so that radial coming-out of the inter-coil insulator 100 is restricted and securely prevented. In particular, since the gaps between the end portions 512a, 512b of the distal end portions 512A, 512A of the tooth portions 512, 512 are closed by the mutually contacting portions 1091, 1092 of the slot insulator 1090, the radial coming-out of the inter-coil insulator 100 can be securely prevented with more reliability.

Further, the engaging portions 103, 103 of the inter-coil insulator 100 are protruded, at at least one of their axial both end portions, radially and toward the side opposite to the rotor 6 side so as to be engaged with the insulator 530. Therefore, as in the first embodiment, the possibility that the inter-coil insulator 100 may be shifted axially so as to axially come out of the coil windings 520 can be prevented securely.

Furthermore, since the stator can be securely prevented from coming-off from the inter-coil insulator 100, use of this stator makes it feasible to fulfill a motor and a compressor (see FIGS. 1 and 3) both of high reliability.

Needless to say, the constituent members described in the first to third embodiments and the modifications may be combined thereamong as required, and moreover selected, replaced or deleted as required.

What is claimed is:

1. A stator comprising:
   a stator core having a plurality of tooth portions arrayed circumferentially with intervals therebetween;
   an insulator fitted to each of axial end faces of the stator core;
   a coil wound on the tooth portions of the stator core, the insulator being interposed between the stator core and the coil;
   a slot insulator placed within each of slot portions that are spaces between circumferentially neighboring ones of the tooth portions, the slot insulator being interposed between the stator core and the coil; and
   an inter-coil insulator including a first inter-coil insertion portion and a second inter-coil insertion portion placed between circumferentially mutually neighboring windings of the coil, and a folding-bottom portion connecting the first inter-coil insertion portion and the second inter-coil insertion portion with the first inter-coil insertion portion extending from a first end of the folding-bottom portion and the second inter-coil insertion portion extending from a second end of the folding-bottom portion,
   the inter-coil insulator being sheet shaped and folded over a width equal to double a sheet thickness at the folding-bottom portion extending along an axial direction,
   the folding-bottom portion being positioned on a distal end side of the tooth portions; and
   movement of the folding-bottom portion in a radial direction toward the rotor is restricted by
      extending portions of the stator core extending on a distal end side of the tooth portions or
      extending portions of the slot insulator extending on the distal end side of the tooth portions.

2. The stator as claimed in claim 1, wherein
   the folding-bottom portion has a cross section formed into a tilted U shape or a U shape.

3. The stator as claimed in claim 1, wherein
   a circumferential width of the folding-bottom portion is larger than a circumferential width of a slot opening.

4. The stator as claimed in claim 1, wherein
   a gap between distal ends of neighboring ones of the tooth portions is closed by the extending portions of the slot insulator extending on the distal end side of the tooth portions.

5. A stator comprising:
a stator core having a plurality of tooth portions arrayed circumferentially with intervals therebetween;
an insulator fitted to each of axial end faces of the stator core;
a coil wound on the tooth portions of the stator core, the insulator being interposed between the stator core and the coil;
a slot insulator placed within each of slot portions that are spaces between circumferentially neighboring ones of the tooth portions, the slot insulator being interposed between the stator core and the coil; and
an inter-coil insulator placed between circumferentially mutually neighboring windings of the coil,
the inter-coil insulator being folded at a folding-bottom portion extending along an axial direction,
the folding-bottom portion being positioned on a distal end side of the tooth portions,
movement of the folding-bottom portion in a radial direction toward the rotor is restricted by
    extending portions of the stator core extending on a distal end side of the tooth portions or
    extending portions of the slot insulator extending on the distal end side of the tooth portions, and
the inter-coil insulator having, in at least one of a pair of axial end portions thereof, an engaging portion provided protruded radially on one side opposite to a rotor side so as to be engaged with the insulator.

6. The stator as claimed in claim 5, wherein
the engaging portion of the inter-coil insulator is provided at one of a pair of radial end portions of the inter-coil insulator on one side opposite to the rotor side.

7. The stator as claimed in claim 5, wherein
the insulator includes
    an engaged portion to be engaged with the engaging portion of the inter-coil insulator, and
    a chamfered guide portion guiding the engaging portion to the engaged portion.

8. The stator as claimed in claim 1, wherein
the coil includes a pair of ends, and at least one of a pair of axial ends of the inter-coil insulator is positioned radially inside of both ends of the coil.

9. A motor including the stator of claim 1, the motor further comprising:
a rotor,
the stator being placed so as to be radially opposed to the rotor.

10. A compressor including the motor of claim 9, the compressor further comprising:
a closed container; and
a compression mechanism section placed within the closed container,
the motor being placed within the closed container to drive the compression mechanism section.

11. The stator as claimed in claim 2, wherein
a circumferential width of the folding-bottom portion is larger than a circumferential width of a slot opening.

12. The stator as claimed in claim 6, wherein
the insulator includes
    an engaged portion to be engaged with the engaging portion of the inter-coil insulator, and
    a chamfered guide portion guiding the engaging portion to the engaged portion.

13. The stator as claimed in claim 5, wherein
the coil includes a pair of ends, and at least one of a pair of axial ends of the inter-coil insulator is positioned radially inside of both ends of the coil.

14. A motor including the stator of claim 5, the motor further comprising:
a rotor,
the stator being placed so as to be radially opposed to the rotor.

15. A compressor including the motor of claim 14, the compressor further comprising:
a closed container; and
a compression mechanism section placed within the closed container,
the motor being placed within the closed container to drive the compression mechanism section.

\* \* \* \* \*